United States Patent [19]

Ong

[11] 4,363,969
[45] Dec. 14, 1982

[54] LIGHT SWITCHED SEGMENTED TOMOGRAPHY DETECTOR

[76] Inventor: Poen S. Ong, 9 Stonegate, Houston, Tex. 77024

[21] Appl. No.: 169,297

[22] Filed: Jul. 16, 1980

[51] Int. Cl.³ .......................... G01T 1/20; G01T 1/22
[52] U.S. Cl. .................................... 250/367; 250/370
[58] Field of Search ............. 250/363 R, 361 R, 366, 250/367, 368, 369, 370; 357/29

[56] References Cited

U.S. PATENT DOCUMENTS 3,936,645  2/1976  Iversen ................................ 250/367
4,101,924  7/1978  Brown et al. ....................... 250/370
4,233,514  11/1980  Kingsley ............................ 250/370

Primary Examiner—Alfred E. Smith
Assistant Examiner—Janice A. Howell

[57] ABSTRACT

An array of optically isolated small area scintillators overlie a duophotoconductive sandwich, which includes interdigitated electrodes. The sandwich structure wound each interdigitated electrode is precharged to act as a separate small area detector. The duophotoconductive sandwich includes a photoconductive layer adjacent the scintillators and a second photoconductive layer which, in cooperation with the interdigitated electrodes, acts as a switch, when activated by a beam capable of generating charge carriers in the photoconductor, thus successively connecting each of the small area detectors to a low noise preamplifier.

Two embodiments, an experimental setup and a method of operation are disclosed.

10 Claims, 5 Drawing Figures

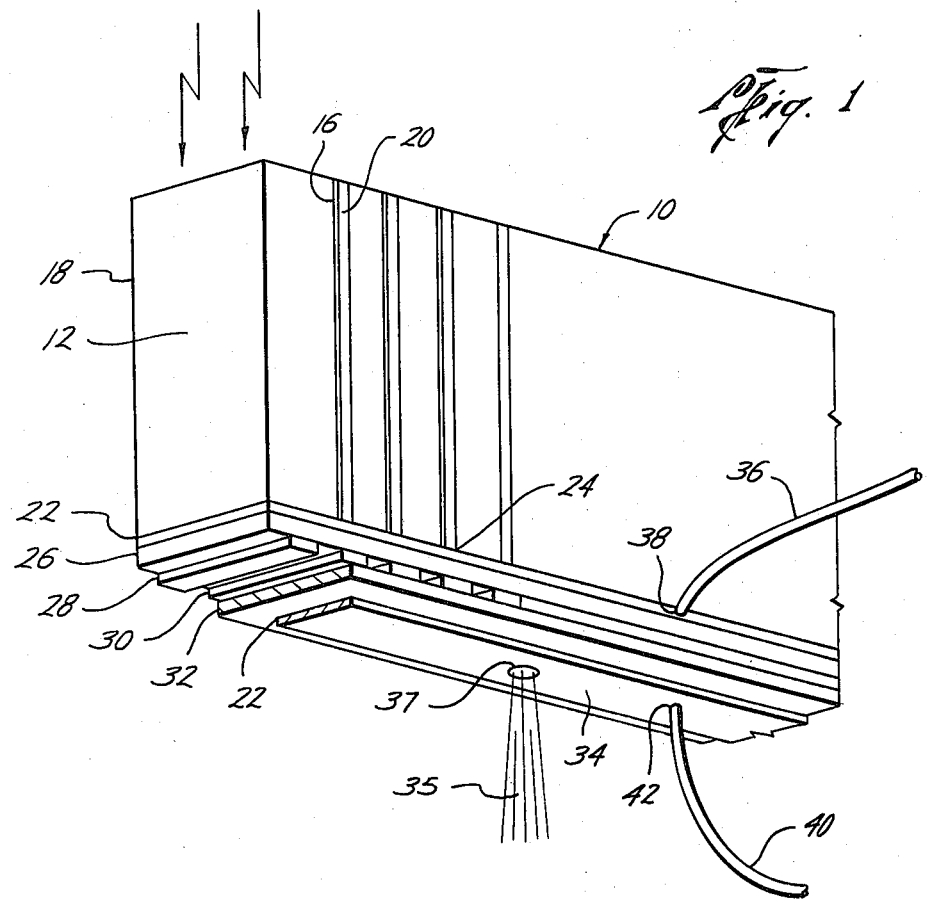
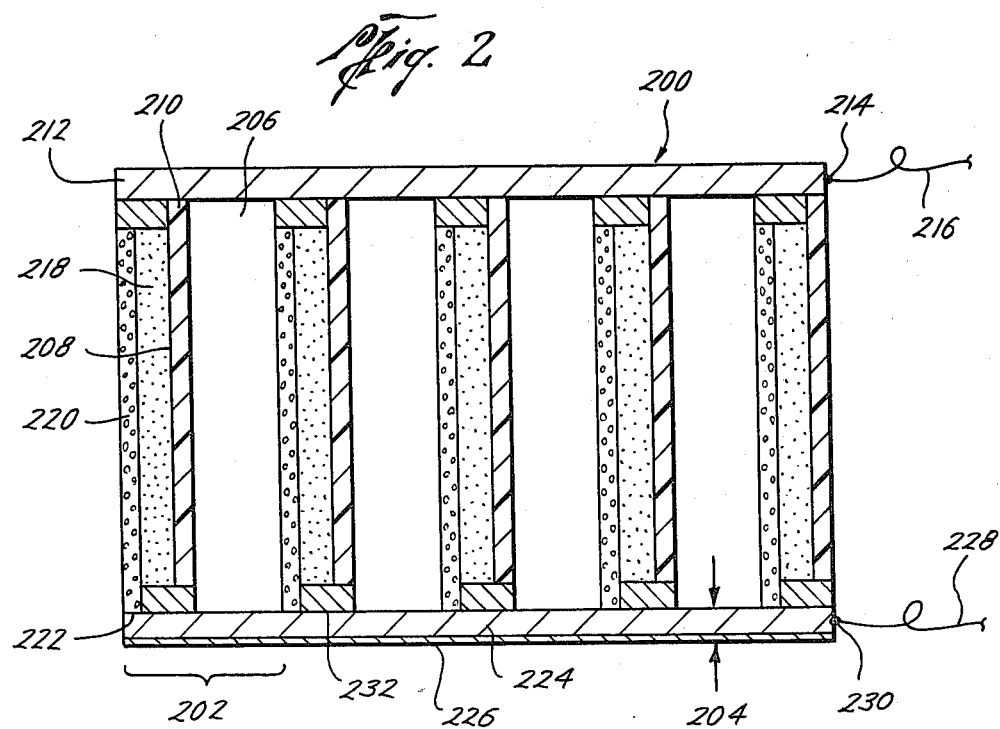

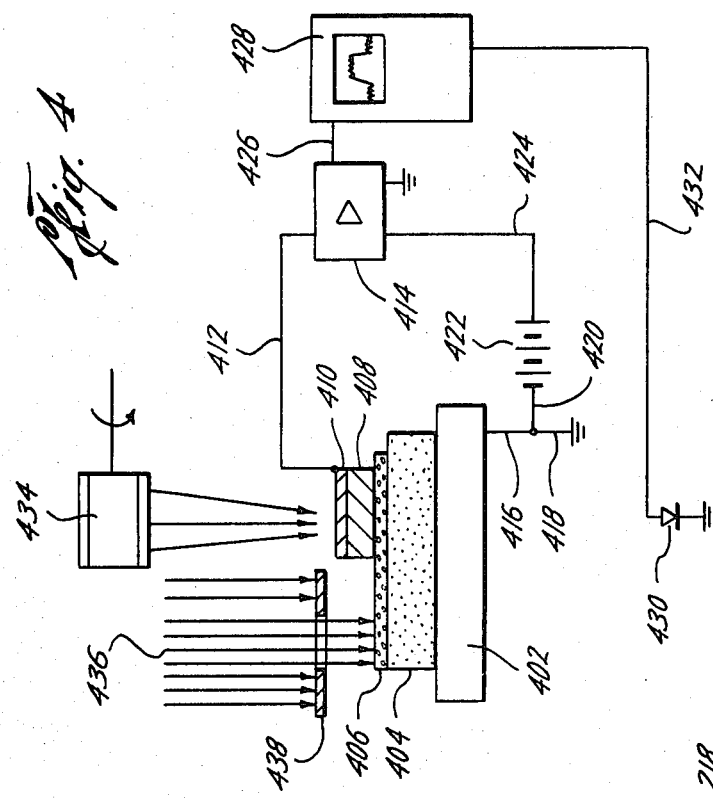
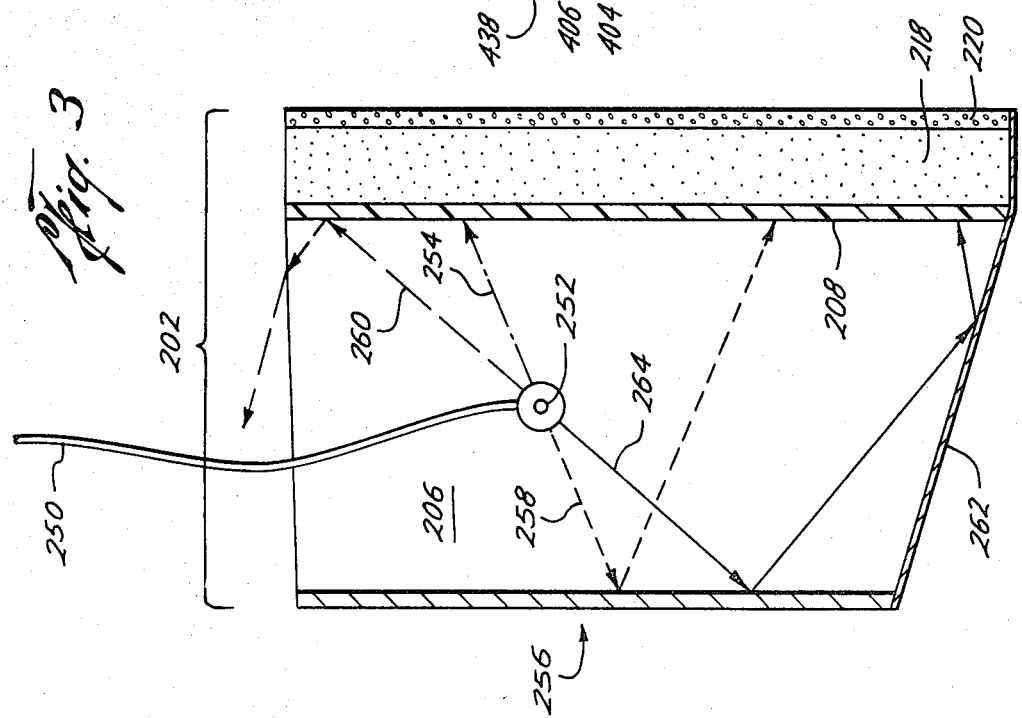

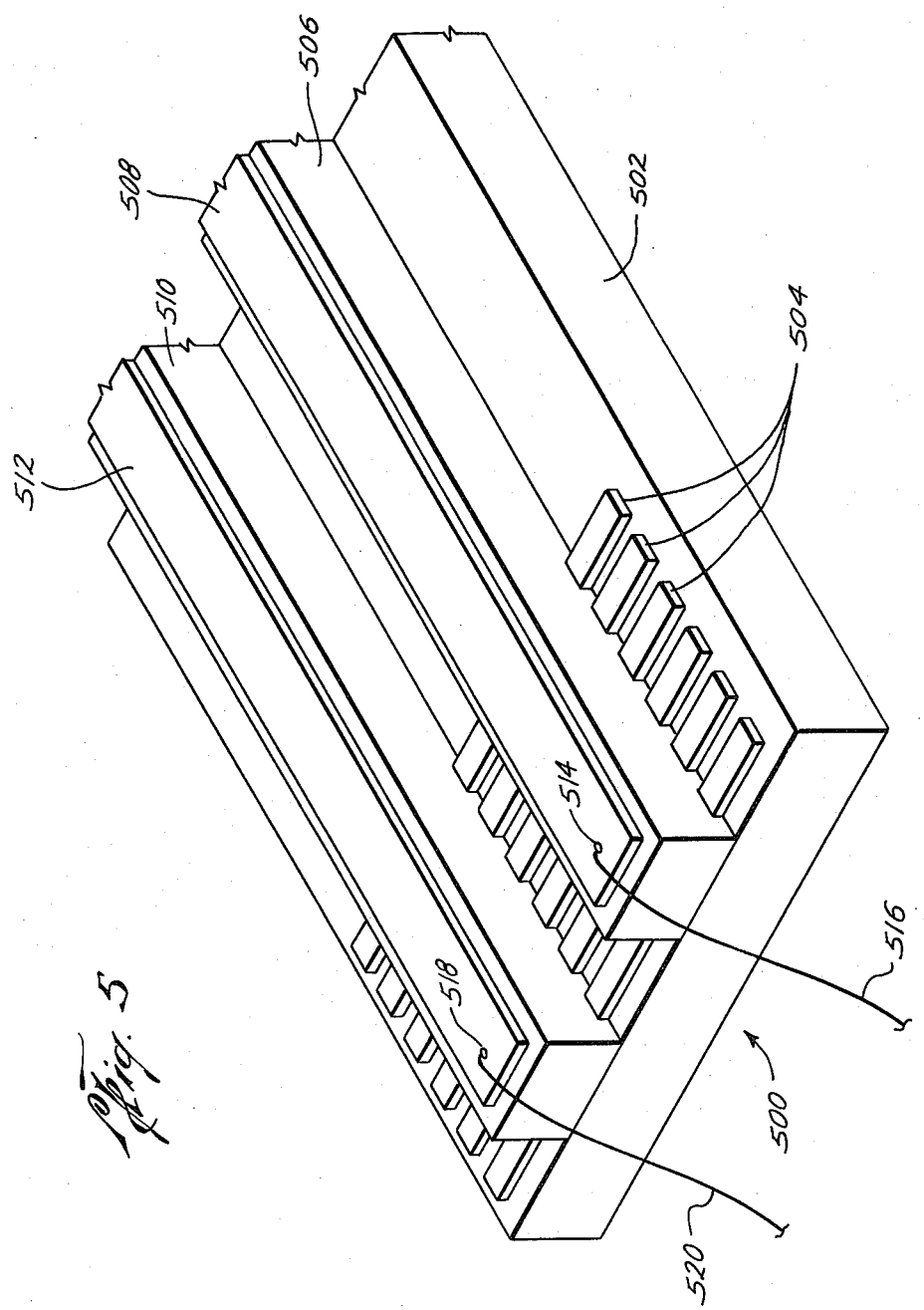

LIGHT SWITCHED SEGMENTED TOMOGRAPHY DETECTOR

FIELD OF THE INVENTION

The present invention relates generally to photon detector structures and methods. More specifically, the present invention relates to light scanned duodielectric detectors using scintillators to increase their detection efficiency for high energy x-ray detection. Even more specifically, the present invention relates to such duodielectric scintillator sandwich structures useful for industrial x-ray tomography.

BACKGROUND ART

Computerized tomography is a non-invasive diagnostic tool used in neuroradiology and other disciplines to supplement two-dimensional whole body radiography.

Simply stated, tomography requires that a detector, not x-ray film, pick up the radiation emanated from two "slices" of tissue per revolution. Conventional radiology teaches slices that are up to 1.3 centimeters thick. A total of 25-30,000 or more detector readings may be obtained from each slice. These readings are stored digitally and manipulated by a computer that has been programmed to solve a large number of simultaneous equations.

The underlying principle of computerized tomography is that the slight differences in radiation absorption coefficient between tissues of various densities permit differentiation of various organs and body parts. It also permits detection of abnormal densities. A computer, which is an integral part in any tomography display system, provides a digital printout of calculated density values for each "slice". This information is then transformed to a density image which is viewed on a modulated cathode ray tube. The operator of conventional computerized tomography systems can selectively display various density levels in ultra-contrast to enhance visualization.

At the present time computerized tomography is used primarily in medicine. This non-invasive technique now appears to be the simplest and most accurate screening procedure for suspected inter-cranial pathological conditions.

Present computerized tomography equipment is made almost exclusively for medical use. In medicine, the patient, which is the object being examined, consists largely of low atomic number elements. Low atomic number elements require use of low energy x-ray photons.

There is a great deal of industrial interest in using computerized tomography for creating images of metal parts and the like. The advantage is obvious, i.e. the technique is non-evasive and hence non-destructive. Unfortunately, present state of the art medical tomographic equipment is virtually useless for industrial tomography.

Present medical instruments are not suitable for use with samples that contain significant amounts of high atomic number elements. The reason current tomographic detectors are not effective for industrial imaging is because they are not designed to respond to the high energy photons which must be used to penetrate a sample containing high atomic number elements.

The x-ray detector array is a vital component of any tomographic system. Generally prior art detectors comprise a linear array of small narrow detectors. The width of the active areas of each detector element determines the pixel size of the tomograph and thus its resolution.

Depending on the field size and the detector width, as many as a thousand separate detectors can be contained in a conventional tomographic scanning array. Each detector taught by the prior art must be electrically insulated from its neighbors and requires a separate amplifier. This creates a very serious problem in conventional computerized tomography because each of the detector/amplifier combinations must have identical sensitivity and spectral response.

Any change in sensitivity or spectral response between the plurality of amplifiers used by conventional systems produces noise and non-linearity in the output signal corresponding to differences in zero and span for the electric waveform put out by the amplifier.

Two types of detectors are primarily used in prior art computerized tomographic medical instruments. The first is a gas ionization chamber which contains a gas such as xenon at high pressure, i.e. from 5-25 atmospheres. The gas chamber is subdivided into a large number of narrow subdetectors by metal electrodes. Because they use a gas, which has much lower density than a solid, such ionization chambers are completely impractical for use with the high energy x-rays that would be required by industrial tomography to penetrate high atomic number materials, such as steel, lead, titanium, or the like.

The second type of detector uses a solid scintillator such as NaI to convert x-rays into visible light. This light is subsequently measured by a photo multiplier tube. This type of scintillator detector has excellent absorption coefficients and acceptable efficiency. Unfortunately, photo multipliers are bulky, costly, short-lived and very noisy.

It is a purpose of the present invention to provide a small, simple and solid-state device capable of combining the advantages of a solid scintillator with the low-noise characteristics of solid-state electronics.

It is a further purpose of the present invention to provide a very high resolution tomographic detector capable of effectively sensing the high energy x-rays required by industrial tomography.

Another purpose of the present invention is to provide an apparatus that requires only a single, low noise, high gain stabilized amplifier, thus avoiding the zero drift and nonlinear span problems associated with prior art tomographic systems.

Yet another purpose of the present invention is to provide an industrial tomographic detector whose constituent detector segments are capable of being switched to an amplifier by a scanning beam of photons or any particles capable of creating charge carriers in a photoconductor.

Yet a further purpose of the present invention is to provide a simple, solid-state detector that is capable of providing high resolution for industrial tomography at low-cost.

BRIEF DESCRIPTION OF THE DRAWINGS

FIG. 1 is a partially cutaway three-dimensional drawing of an industrial tomographic detector constructed according to the preferred embodiment of the present invention.

FIG. 2 is a top view of a detector structure for industrial tomography constructed according to a second preferred embodiment of the present invention.

FIG. 3 is a detailed view taken along lines 3—3 of FIG. 2.

FIG. 4 is the schematic view of a experimental detector structure constructed according to the preferred embodiment of the present invention.

FIG. 5 is a isometric view of a detector constructed according to the present invention that operates without a scintillator.

DETAILED DESCRIPTION OF THE PREFERRED EMBODIMENT

FIG. 1 is a three-dimensional, partially cutaway view of a industrial tomographic detector constructed according to a preferred embodiment of the present invention.

Structurally, detector array 10 includes a plurality of scintillators 12, each of which may be from 0.5 to 1 millimeter wide and several times as thick as it is wide. The depth of scintillator crystal 12 is chosen so the scintillator will absorb a significant fraction, i.e. 90%, of the x-radiation 14 falling on it. Scintillator crystal 12 may be any convenient scintillator such as cesium iodide (CsI) or sodium iodide (NaI). Scintillator crystal 12 can be made of extruded one millimeter diameter NaI fibers, which have recently become commercially available.

Scintillator crystal 12 is optically isolated by a low refractive index coating 16 on its right-hand side and a second low refractive index coating 18 on its left-hand side. The low refractive index coatings of each of the NaI scintillator crystals is further separated optically by an opaque coating 20, which lies between each of the individual small scintillators 12. A duo-dielectric sandwich structure 22 is affixed by vapor deposition, optical cement, or otherwise to the bottom of scintillator array 10. In FIG. 1 duo-dielectric structure 22 is shown partially cutaway for ease of comprehension.

Duo-dielectric structure 22 comprises a first semitransparent conductor 24, which is the layer most proximate the bottom of scintillator array 10. First semitransparent layer 24 may be a thin coating of gold or any other conductor that is reasonably transparent. A first photoconductive layer, 26 is affixed by vapor deposition or any other convenient means to the side of first transparent conductive layer 24 opposite scintillator array 10. First photoconductive layer 26, also referred to as write layer 26, may be a layer of amorphous selenium or any other photoconductor capable of changing its resistivity and response to photons from scintillator 12. Typically, first photoconductive write layer 26 will be about 10-100 micrometers thick.

A plurality of interdigitated conductive electrodes 30 are affixed by vapor deposition to and are in electrical contact with photoconductive layer 26 opposite first transparent conductive layer 24. Interdigitated electrode 30 is positioned so as to be proximate and below scintillator crystal 12 in the duo-dielectric sandwich structure 22. Each scintillator crystal in array 10 has its corresponding interdigited gold electrode proximate and beneath it in the duo-dielectric sandwich structure 22.

A thin insulating layer 28 is affixed by any convenient means to the side of first photoconductive layer 26 opposite first semitransparent conductor 24 between interdigitated electrode 30.

A second photoconductor layer 32 is affixed by deposition or other convenient means to the side of interdigitated gold electrode 30 opposite the side affixed to insulator 28. Second photoconductive layer 32, also referred to as read layer 32, may be amorphous selenium or any other conductor having a high effective dark resistivity and capable of having a large change in resistivity when it is scanned by a reading beam such as read beam 35, which may be the output of a laser.

A second semitransparent conductive layer 34 is affixed by vapor deposition or other convenient means to the side of read layer 32 opposite interdigited electrodes 30.

Second semitransparent conductive layer 34 may be a thin layer of gold or other transparent conductive coating.

First electrical output lead 36 is affixed in electrical connection 38 to first semitransparent conductive layer 24. Second electric lead 40 is electrically connected at connection 42 to the second semitransparent conductive layer 34. Electrical lines 36 and 40 should be insulated. Electrical lines 36 and 40 carry the signal output by the duo-dielectric sandwich structure when the detector array is functioning to a low noise preamplifier, not shown.

In operation, the present invention operates in a light tight housing.

Functionally, x-ray flux 14, which may be the output of an industrial x-ray tube being used for nondestructive tests of components containing high atomic number metals, strikes scintillator crystal 12. Scintillator crystal 12 is chosen so that the scintillator will absorb about 90% of the radiation impinging on it.

X-rays absorbed by the scintillator will generate light photons in a rate of about one light photon for each 50 eV of x-ray energy for NaI. Each scintillator acts as an optical channel with no lateral spread in the direction of the detector axis because of low refractive index coatings 16 and 18 and opaque coating 20.

The x-ray photons are converted to light photons at very high efficiency by the scintillator. These light photons then penetrate semitransparent conductor 24 and strike photoconductor write layer 26.

Photoconductor write layer 26 is precharged with a uniform electric field by a method as follows:

In the dark, a voltage is applied across semitransparent conductive layers 24 and 34. This causes a voltage to develop across each of the photoconductive layer 26 and 32 of duo-dielectric sandwich structure 22. The electric charge across each of the photoconductive layers is inversely proportional to the layer's capacitance.

It is conceptually helpful to consider the duo-dielectric sandwich structure 22 as a duo-capacitor. Each of the detector units represented by an interdigitated electrode such as electrode 30 is really two capacitors. The dielectrics in each case are two photoconductive layers 26 and 32 while the interdigitated electrode 30 serves as the center electrode between the capacitors. All of these detector elements are connected in parallel by means of semitransparent conductive electrodes 24 and 34.

If a light beam, such as light beam 35, is directed onto the photoconductor read layer 32, then the resistance of photoconductive layer 32 drops, which effectively short circuits the capacitor it represents. Thus the applied voltage placed on the duo-dielectric sandwich structure 22 will now appear across write photoconductive layer 26.

When light beam 35 is turned off, the high internal dark resistance of the photoconductor in write layer 26 will maintain this charge.

When photons from scintillator 12, which are directly proportional to the degree of x-ray exposure, fall on photoconductive write layer 26, they interact with the photoconductor to create electron hole pairs, which cause a voltage drop in the charge on the photoconductor appearing at each of the interdigitated elecrodes 30.

The amount of x-ray exposure absorbed by each scintillator is a direct function of the number of light photons generated by the scintillator. The number of light photons generated by the scintillator is a direct function of the number of electron hole pairs generated in photoconductive write layer 26. Thus the degree of discharge, or the voltage drop, appearing at each of the interdigitated electrodes 30 associated with each of the scintillator crystals in array 10, reflects the amount of x-ray flux falling on the scintillator.

These varying voltages on the interdigitated electrodes across detector array 10 may subsequently be read out by sequentially illuminating photoconductor read layer 31. When photoconductor read layer 32 is illuminated by a small spot 37 produced by focused read laser light beam 35 or the like, the photoconductor read layer 32 beneath each of the interdigitated electrodes associated with each of the scintillation crystals of the detector array 10 will become conductive and the voltage on each of the interdigitated electrodes will be restored through a current flow in the external circuit made up of electrical wires 36 and 40 to the low noise preamplifier, not shown.

As the beam 35 is scanned across read layer 32, the output currents flowing in lines 40 and 36 will be a video signal. The detector is then ready to be written in. Again, it need not be recharged because the readout operation recharges the write photoconductor.

The present invention does not have internal amplification, as would be the case in a photo multiplier, and thus requires a low noise high gain amplifier to further process the signal, but the present invention is constructed in such a way that only one such amplifier is required for the whole scintillator array. The internal switching within the detector structure being accomplished by the light or charged particle beam 35 scanning photoconductor read layer 32, as described above.

The detector structure taught in connection with FIG. 1 above, can be used without the scintillator to directly respond to x-rays. This embodiment of the present invention is discussed in connection with FIG. 5 below. In this case, the overall quantum efficiency would be better by a factor of three, as compared to the case where a scintillator is used. However, since write photoconductive layer 26 can be made no thicker than about 0.5 millimeter, the absorbed fraction of high energy x-rays, such as those that would be needed to do industrial tomography of high atomic weight materials, would be very low even when the beam is incident at grazing angles. The use of such a "naked", i.e. convertor without a scintillator, is therefore advantageous only at x-ray energies below 100 kv. At all higher x-ray energies it is desirable to use a scintillator to convert the high energy x-rays to light photons.

FIG. 2 shows a top view of a detector array constructed according to a second embodiment of the present invention.

In FIG. 2, detector array 200 comprises a plurality of detector sandwich modules 202 that are affixed and electrically connected at one side to dielectric structure 204.

Structurally, detector module 202 includes a scintillation crystal 206, a first transparent electrode 208 affixed to one side of scintillator crystal 206, said transparent electrode being electrically connected at electrical connection 210 to electrode 212. Electrode 212 is, in turn, electrically connected, through electrical connection 214, to output line 216, which is connected to a low noise preamplifier, not shown.

Write photoconductor layer 218 is affixed to transparent electrode 208 on the side of transparent electrode 208 opposite scintillation crystal 206. Interdigitated electrode 220 is affixed to the side of write photoconductor 218 opposite first transparent electrode 208.

Interdigitated electrode 220 is in electrical contact at contact point 222 with read photoconductive layer 224 of dielectric structure 204. Dielectric structure 204 runs along the edge of the detector array and one side of photoconductive read layer 224 and is in electrical contact with each interdigitatal electrodes 220. A second transparent conductive electrode 226 is affixed to and in electrical contact with read photoconductor 224 on the side of read photoconductor 224 opposite the side that is in electrical contact with interdigitated electrodes 220. An output line 228 is electrically connected at 230 to second transparent conductive electrode 226. Output line 228 is connected to a low noise preamp, not shown.

Insulating blocks 232, which separate electrodes 208 and 220 electrically, lie proximate electrodes 212 and read photoconductive layer 222.

Functionally, x-ray photons strike the scintillator 206 and cause it to produce light photons. These light photons pass through transparent conductive layer 208 and generate electron hole pairs in write photoconductive layer 218.

A uniform electric charge is placed across the capacitor formed by electrode 220, write photoconductor 218 and electrode 208 as follows:

In the dark, an electric potential is impressed across electrodes 226 and 212. As in the example discussed in connection with FIG. 1 above, this charge divides across the duo-dielectric formed by transparent conductive layer 226, read photoconductive layer 224, interdigited electrode 220, write photoconductive layer 218 and transparent electrode 208, which is connected to electrode 212.

It is conceptually convenient to functionally consider the embodiment of the present invention shown in FIG. 2 as two capacitors attached in series. The interdigited electrode in each detector module 202 of detector array 200 serves as the center electrode for the connection between the two capacitors.

When an electric potential is impressed across electrodes 226 and 212, a voltage is created across both of the capacitors in this duo-dielectric, each according to its respective capacity. If write photoconductor 224 is scanned by a light beam, such as the laser light beam mentioned above in connection with FIG. 1, then the photoconductor's resistance is greatly lowered by the formation of electron hole pairs where the light strikes. This causes the entire potential impressed across electrodes 224 and 212 to appear across the capacitor formed by interdigited electrode 220, write photoconductor 218 and transparent conducting electrode 208, which is connected to electrode 212.

When the scanning light is turned off, the high dark resistance of photoconductor 218 maintains the uniform potential across the detector sandwich. When light photons generated by the effect of x-ray photons on scintillator 206 penetrate transparent conductive electrode 210, they create electron hole pairs in write photoconductor 208 and partially discharge this uniform surface charge. This causes the potential on interdigitated electrode 220 to drop. The drop in potential on interdigitated electrode 220 is a function of the amount of x-ray exposure received by detector module 202.

As was discussed in connection with FIG. 1 above, if a light beam, such as a laser beam, is then scanned through transparent electrode 226 into read photoconductor 224, then the resistance of the photoconductor 222 will decrease where the light strikes it. When this short circuiting occurs, the potential applied on 226 in each module 202 will be impressed from interdigitated electrode 220 onto electrode 226 and will flow through electrical wire 228 to the low noise preamplifier, not shown. The voltage on each interdigitated electrode will be restored through current flow in the external circuit.

The scanning light beam thus generates a video signal on output lines 228 and 216. This video signal corresponds to the amount of x-ray photon flux falling on the scintillators of each of the detector modules 202.

The purpose of insulators 232, is to insure that the potential between the tip of electrode 220 proximate electrode 212 is not discharged when light photons from the scintillator crystal 206 cause the photoconductor 218 to become conductive.

FIG. 3 is a view of one detector module 202 shown in FIG. 2 taken along section lines 3—3.

In FIG. 3, like numbers indicate like structures to FIG. 2.

Module 202 is shown with scintillator 206 being edged on one side with transparent conducting electrode 208, read photoconductor 218, which may be amorphous selenium or any convenient photoconductor having a high dark resistance, and interdigitated electrode 220. When an x-ray photon 250 strikes NaI molecule 252, a photon will be emitted. The paths of several representative photons are shown in FIG. 3.

Photon path 254 illustrates a photon that has been emitted in such a way as to directly penetrate transparent electrode 208 and generate ion hole pairs in write photoconductor 218.

Module 202 is equipped with an aluminum reflector 256 which reflects photons along photon path 258 whose path is shown moving from NaI molecule 252 to reflector 256 and then back through transparent electrode 220 into photoconductive layer 218.

It is possible for a photon, such as photon ray 260 to be totally reflected from the transparent electrode 208's interface with selenium crystal 218. Some of these photons that would otherwise be lost may be captured by shaping module 202 interior surfaces as is shown at bottom 262. See, for example, the action of photon ray 264, which would have been lost by escape from a surface perpendicular to the selenium transparent electrode surface.

In the above-described modular approach, each scintillator unit with its multi-layered coatings forms a single detector unit which is capable of converting x-ray photons into electrical charges. One of the advantages of the detector taught by FIGS. 2 and 3 is that such a structure can be fabricated as a large sheet which may subsequently be cut up into small channels. Such mass production assures uniformity of components, i.e. uniform x-ray, optical and electrical response of the individual modules. Each channel has two electrodes, 208 and 220, in FIG. 2, which can, during assembly, be connected to appropriate external circuitry. It is also possible to "pot" the entire detector array in a transparent plastic after assembling the modules and to then apply the read selenium layer and transparent electrode for optical readout to the potted assembly. In this embodiment the interdigitated electrode 220 may also serve as the reflector 256.

If the depth dimension (in the x-ray dimension) of photoconductor 218 is much larger than the width of the scintillator, then the area of the selenium which receives light due to a specific energy of x-ray photons is quite localized. It is then possible to subdivide transparent electrode 208 into segments along the direction of penetration of the x-ray beam into scintillator 206. By switching these various depth segments of transparent electrode 208 in a controlled manner to the preamplifier, it would be possible to sense the depth within crystal 206 where the x-ray photon is absorbed and re-emitted as a light photon. Since the depth distribution of the absorption of x-rays is closely related to x-ray energy, various sublevels within the crystal 206 would respond to different energy levels of x-rays. This method is similar to the technique used by Kaplan, et al. in "Split Electron Xenon Detectors". See, *Nucl. Inst. Meth.* 106,397 (1973).

Experimental System

The applicant has studied the read/store/write properties of a device constructed according to the preferred embodiment of the present invention, but without scintillation. This device is illustrated schematically in FIG. 4.

In FIG. 4 an aluminum baseplate 402 is coated with a 130 micrometer thick layer of amorphous selenium 404. This portion of the experimental device is cut from a Xerox TM plate and represents the write photoconductor section of the devices discussed in connection with FIGS. 1, 2 and 3 above. Forty (40) spaced apart interdigitated gold electrodes 406 are deposited on write selenium layer 404 using a mask. Each of these electrodes is approximately three millimeters wide and 17 millimeters long. The spacing between them is one millimeter. One-half of each of these interdigitated electrodes is coated with a 20 micrometer thick read layer of amorphous selenium 408 by means of vacuum deposition. Finally, selenium layer 408 is coated with a semitransparent gold electrode 410.

Gold electrode 410 is connected by line 412 to a low noise preamplifier 414. Low noise preamp 414 is a Mech-Tronic 403 Low Noise Preamp. Aluminum baseplate 402 is connected via line 416 to ground 418 and via line 420 to one side of 300-Volt battery 422. The other side of 300-Volt battery 422 is connected via line 424 to the other side of Mech-Tronic's low noise preamp 414. The output of Mech-Tronic low noise preamp 414 is carried by line 426 to the input of storage oscilliscope 428. A solar cell 430 is used to trigger the sweep of oscilliscope 428 through line 432.

Electrical connections are made with conductive epoxy. The bias voltage provided by battery 422 is 300-Volts. The small solar cell 430 is mounted on one side of the experimental device to provide the sweep trigger signal to storage oscilliscope 428.

A read beam is obtained from a microscope illuminator lamp, not shown, and focused into a spot approximately one millimeter in diameter. Scanning is accomplished by means of a rotating mirror 434, which is driven by a variable speed motor. The write beam is a small gas discharged UV source 436. Modulation of write signal 436 is accomplished by varying the area illuminated by the write signal by use of a perforated paper mask 438.

The experimental device worked well, but there were variations in output amptitude due to nonuniformity of electrode areas and spacings. Also, the amptitude of the signals are reduced to 85%, 70%, and 58%, as compared to their original values, when the scanning/read beam waits 2, 5 and 8 seconds, respectively, to read out the data read into the system. Moreover, other measurements conducted with this experimental apparatus indicate that the intensity of the read beam in the experimental setup was not intense enough to fully read out the signal in one scan cycle. During each scan cycle approximately 35% of the stored charges were removed.

All of these experimental tests were conducted with light photons.

FIG. 5 is an isometric overhead view of the structure of an embodiment of the present invention that does not use a scintillator.

This is the "naked" embodiment that was briefly discussed on page 8, above.

FIG. 5 shows a nonconductive substrate 502 onto which are deposited, by vapor deposition or other convenient means, a plurality of narrow interdigitated electrodes 504.

A read photoconductive layer 506 is laid down orthogonal to and in electrical contact with interdigitated electrodes 504. A transparent conductive electrode 508 is deposited in electrical contact with and on top of read photoconductive layer 506. A electrical connection 514 connects amplifier lead 516 to top transparent conductive electrode 508. Lead 516 is operationally connected to a low noise preamplifier, not shown.

A write photoconductive layer 510 is deposited in electrical contact with and orthogonal to interdigitated electrode 504. Write electrode 510 is shown in FIG. 5 as being substantially parallel to and spaced apart from read electrode 506. It should be understood that this parallel arrangement is a mere convenience of illustration. Electrodes 510 and 506 may be at any angle with respect to one another so long as they are electrically isolated except for their connection by interdigitated electrodes 504.

Second conductive transparent electrode 512 is affixed, by vapor deposition or other convenient means, to and in electrical contact with the top of write photoconductor 510. An electrical connection 518 connects amplifier output line 520 electrically to transparent conductive electrode 512. Amplifier line 520 is operationally connected to a low noise preamplifier, not shown.

It should be understood that the transparent electrodes 512 and 508 need not be perfectly transparent. They may be semitransparent. It is sufficient that these electrodes have the capability to allow a scanning beam capable of creating charge carriers within read and write photoconductors 506 and 510, respectively, to pass through them.

This device, as all of the embodiments of the present invention described in this specification is designed to operate in the dark, i.e. in a light-tight housing.

As in the other embodiments discussed above, in the dark, each element of detector array 500 can be represented as two capacitors connected in series. The interdigitated electrodes 504 serves as the center electrode between the capacitors. All the detector elements are connected in parallel by means of the surface electrodes 512 and 508.

When, in the absence of light, a voltage is applied through lines 516 and 520 on surface electrodes 508 and 512, a voltage will develop across each of the photoelectric layers 506 and 510, which may be made of amorphous selenium. These volages will be inversely proportional to the capacitance of each of the capacitors in the duo-dielectric structure.

If a light beam, or any other beam capable of creating charge carriers in the photoconductor 506 is directed through transparent conductor 508 onto photoconductor layer 506, then the charge carriers it generates will effectively shortcircuit the photoconductive layer. The voltage applied across electrodes 508 and 512 will thus be found entirely across the capacitor formed by the interdigitated electrodes 504, photoconductor 510, and transparent conductive electrode 512.

This charged condition of photoconductor 510 is maintained when the light beam is turned off due to the high dark resistance of photoconductive layer 506.

When a spot beam of photons, or any other particles capable of creating charge carriers within photoconductive layer 510, is directed at photoconductive layer 510, charge carriers will be generated which will cause a voltage drop in the selenium surface charge adjacent to the interdigitated electrodes 504. This voltage modulation across the detector array can subsequently be read out by sequentially illuminating the surface of photoconductor 506 through transparent conductive layer 508. The scanning beam size is preferably about the same size as the interdigitated electrodes 504, so as not to lose resolution by illuminating more than one interdigitated electrode at a time. The intensity of the beam would preferably be sufficient to generate enough charge carriers to maximize the usable output of charges flowing through lines 516 and 520 to the low noise preamplifier, not shown.

This output to the low noise preamplifier would be a video signal.

The charge on write photoconductor layer 510 will be restored through current flow in the external circuit, i.e. by a bias voltage.

Using the detector array taught by this embodiment of the present invention it is possible to achieve overall quantum conversion efficiencies better by a factor of 3 than would be the case where a scintillator is used. As was mentioned above, because the photoconductor layer is generally quite thin, the use of the detector structure without a scintillator is advantageous only for relatively low energy photons, i.e. those below 100 kv.

Although certain specific embodiments of the invention are described in detail above, they are so described because they are the best embodiments known to the applicant at the time this application was filed. The invention, however, should not be limited by the specific embodiments described above. The invention should be limited only by the appended claims and their legal equivalents.

I claim:

1. A detector comprising:
scintillator means for converting X-ray photons received at each of a plurality of different areas of the surface of said detector to a proportionate number of light photons;
duo-photoconductive means composed of an amorphous material for converting said light photons to a proportionate amount of electric charge and for storing said electric charge; and
random access switching means for selectively connecting said stored electric charge arising from X-ray photons received at any one of said different areas of the surface of said detector to a single amplifier.

2. A detector as in claim 1 wherein:
said scintillator means comprises:
a plurality of relatively narrow and deep scintillators each said crystal being coated on its sides, but not on its top or bottom, with low refractive index coating, said scintillators being separated by an opaque layer,
said duo photoconductive means comprises a duo photoconductive sandwich structure in optical contact with the bottom of said plurality of scintillators, said sandwich structure comprising:
a first transparent conductive layer adjacent to the bottom of said plurality of scintillators,
a write photoconductive layer adjacent and in electrical contact with said first transparent conductive layer,
a plurality of interdigitated conductive electrodes, at least one of said interdigitated conductive electrodes being aligned and spaced apart so as to be aligned with each of said plurality of scintillation crystals, said electrodes being in contact with said electrical photoconductive layer,
an insulated layer adjacent said write photoconductive layer opposite said conductive layer between said interdigitated electrodes,
a read photoconductive layer adjacent and in electrical contact with said plurality of interdigitated electrodes,
a second transparent conductive layer in electrical contact with and adjacent to said read photoconductive layer opposite said interdigitated electrodes,
said switching means is a particle beam capable of creating charged carriers within said write photoconductive layer, said beam being not larger than said interdigitated electrodes and being intense enough to recharge the charge on said interdigitated electrodes, and
said amplifier is a low noise preamplifier connected electrically to sense current flow between said first and said second transparent conductive electrode.

3. A detector as in claim 2 wherein said switching means is a photon beam.

4. A detector as in claim 2 wherein said write photoconductive layer and said read photoconductive layer are composed of a photoconductor having high dark resistance.

5. An x-ray detector comprising:
a first transparent conductive layer,
a first photoconductor layer, said first photoconductor layer being electrically connected and physically affixed to said first conductive layer,
a plurality of scintillator dielectric modules, said modules being each affixed to a separate part of said first photoconductor layer at an angle,
each said scintillator dielectric module comprising:
a scintillator layer,
a second transparent conductive layer proximate said scintillator layer,
a second photoconductive layer in electrical contact with said second transparent conductive layer opposite said scintillator layer, and
an interdigitated electrode in electrical contact with said second photoconductor layer opposite said second conductive layer, said interdigitated electrode being in electrical contact with said first photoconductor layer, and
a common conductor electrode in electrical contact with the second transparent conductive layer of each of said scintillator dielectric modules.

6. An x-ray detector as in claim 5 including:
first insulating means for electrically insulating said second transparent conductive layer from said first photoconductor layer, and
second insulating means for electrically insulating said interdigitated electrode from said common conductor electrode.

7. An x-ray detector as in claim 6 wherein the angle formed by said plurality of scintillation dielectric modules is a right angle and said common electrode is parallel to said first photoconductor layer.

8. An x-ray detector as in claim 7 wherein said scintillator layer is thicker in the direction of x-ray flux than in its other dimensions.

9. A photon detector comprising:
a nonconducting substrate layer,
a plurality of conductive interdigitated electrodes affixed to said substrate layer, each said interdigitated electrode being electrically isolated,
a first photoconductor layer in electrical contact with a first portion of each said interdigitated electrodes,
a second photoconductor layer in electrical contact with a second portion of each said interdigitated electrodes,
a first transparent conductive layer affixed to and electrically in contact with said first photoconductor layer opposite said interdigitated electrodes, and
a second transparent conductive layer affixed to and in electrical contact with said second photoconductor layer opposite said second portion of said interdigitated electrodes.

10. A photon detector as in claim 9 wherein said interdigitated electrodes are evenly spaced apart and parallel on said substrate and said first and second photoconductor layers are orthogonal to said interdigitated electrodes and mutually parallel.

* * * * *